(12) United States Patent
Yun et al.

(10) Patent No.: US 9,291,236 B2
(45) Date of Patent: Mar. 22, 2016

(54) STRUCTURE OF ENGINE

(71) Applicant: Hyundai Motor Company, Seoul (KR)

(72) Inventors: Jeyong Yun, Bucheon-si (KR); Sung Kwang Kim, Seoul (KR); Ahn Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 160 days.

(21) Appl. No.: 14/098,487

(22) Filed: Dec. 5, 2013

(65) Prior Publication Data

US 2014/0238357 A1 Aug. 28, 2014

(30) Foreign Application Priority Data

Feb. 25, 2013 (KR) ........................ 10-2013-0019964

(51) Int. Cl.
| | |
|---|---|
| F02B 75/06 | (2006.01) |
| F16F 15/26 | (2006.01) |
| F02M 39/02 | (2006.01) |

(52) U.S. Cl.
CPC .............. *F16F 15/264* (2013.01); *F02M 39/02* (2013.01)

(58) Field of Classification Search
CPC ..... F02F 7/0053; F02F 7/0039; F02F 7/0043; F02F 7/0058; F02F 1/243; B60K 17/08; B60K 5/04
USPC .............................. 123/198 R, 195 H, 195 AC
See application file for complete search history.

(56) References Cited

U.S. PATENT DOCUMENTS

| | | | | |
|---|---|---|---|---|
| 1,956,804 A | * | 5/1934 | Meyer ........................ | 123/197.4 |
| 3,759,238 A | * | 9/1973 | Irgens ................ | B27B 17/0033 |
| | | | | 123/192.2 |
| 4,945,866 A | * | 8/1990 | Chabot, Jr. .............. | F02B 41/00 |
| | | | | 123/53.1 |
| 5,076,220 A | * | 12/1991 | Evans ..................... | F02B 41/00 |
| | | | | 123/197.4 |
| 5,186,127 A | * | 2/1993 | Cuatico ................. | F02F 7/0019 |
| | | | | 123/197.4 |
| 5,218,885 A | * | 6/1993 | Nakano ................... | F02B 61/02 |
| | | | | 123/192.1 |
| 5,884,599 A | | 3/1999 | Shiozaki et al. | |
| 6,439,188 B1 | * | 8/2002 | Davis .................... | F02B 61/045 |
| | | | | 123/193.2 |
| 7,089,904 B2 | * | 8/2006 | Morii ...................... | F01M 1/12 |
| | | | | 123/192.2 |
| 8,960,149 B2 | * | 2/2015 | Sugishita .............. | F02F 7/0019 |
| | | | | 123/192.2 |
| 2004/0250789 A1 | * | 12/2004 | Morii ...................... | F01M 1/12 |
| | | | | 123/192.2 |
| 2005/0107194 A1 | * | 5/2005 | Oishi et al. ....................... | 474/28 |
| 2007/0289567 A1 | * | 12/2007 | Eto ....................... | F02B 75/048 |
| | | | | 123/192.1 |
| 2011/0209680 A1 | * | 9/2011 | Katayama et al. ......... | 123/192.2 |
| 2012/0055437 A1 | * | 3/2012 | Yano ...................... | F02B 75/06 |
| | | | | 123/192.2 |
| 2012/0055438 A1 | * | 3/2012 | Yano ........................ | F16C 3/20 |
| | | | | 123/192.2 |
| 2012/0055447 A1 | * | 3/2012 | Yano ........................ | F02D 9/02 |
| | | | | 123/400 |

FOREIGN PATENT DOCUMENTS

| | | |
|---|---|---|
| JP | 7-26980 A | 1/1995 |
| JP | 2007-46633 A | 2/2007 |
| KR | 10-2009-0021539 A | 3/2009 |

* cited by examiner

*Primary Examiner* — Marguerite McMahon
*Assistant Examiner* — Tea Holbrook
(74) *Attorney, Agent, or Firm* — Morgan, Lewis & Bockius LLP

(57) ABSTRACT

A structure of an engine includes: a crankshaft module configured to convert reciprocal motion of a piston into rotational motion; and a first balance shaft module and a second balance shaft module configured to reduce vibration of the engine, in which the first balance shaft module is directly gear-meshed with the crankshaft module, and the second balance shaft module is gear-meshed with the crankshaft module through an intermediate gear.

7 Claims, 2 Drawing Sheets

STRUCTURE OF ENGINE

CROSS-REFERENCE TO RELATED APPLICATION

The present application claims priority of Korean Patent Application Number 10-2013-0019964 filed Feb. 25, 2013, the entire contents of which application is incorporated herein for all purposes by this reference.

BACKGROUND OF INVENTION

1. Field of Invention

The present invention relates to a structure of an engine, and more particularly, to a structure of an engine, which is installed at an engine of a vehicle to improve an noise, vibration, harshness (NVH) of the engine and reduce a weight of the engine.

2. Description of Related Art

In general, a balance shaft module is provided in an engine in order to reduce vibration due to reciprocal motion of a piston.

Installation of additional devices to prevent vibration, noise, and the like, which are generated in the engine, from being transmitted to a vehicle causes increases in cost and weight, and fuel consumption may be increased due to a loss of friction, or the like.

Recently, environmental pollution has predominantly become a problem, which has resulted in tendencies to downsize the engine and reduce a weight of the engine, and therefore a structure of the engine, which reduces vibration and noise of the engine without adding separate devices, is required.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a structure of an engine capable of reducing a weight of an engine, achieving a space saving, and reducing noise and vibration.

Various aspects of the present invention provide for a structure of an engine, including: a crankshaft module configured to convert reciprocal motion of a piston into rotational motion; and a first balance shaft module and a second balance shaft module configured to reduce vibration of the engine, in which the first balance shaft module is directly gear-meshed with the crankshaft module, and the second balance shaft module is gear-meshed with the crankshaft module through an intermediate gear.

In addition, the structure may further include a fuel injection pump module configured to supply fuel at high pressure, and the fuel injection pump module may be gear-meshed with the crankshaft module through the intermediate gear.

A central axis of the crankshaft module may be spaced apart from a cylinder central axis of the engine at a predetermined distance.

The central axis of the crankshaft module may be spaced apart from the cylinder central axis of the engine at a predetermined distance in a central axis direction of the first balance shaft module.

A central axis of the first balance shaft module and a central axis of the second balance shaft module may be disposed to be symmetrical to each other on the basis of the cylinder central axis of the engine.

The central axis of the first balance shaft module and the central axis of the second balance shaft module may be disposed at the same height on the basis of the cylinder.

An axis, which passes through the central axis of the first balance shaft module and the central axis of the second balance shaft module, may be disposed above the central axis of the crankshaft module to be spaced apart from the central axis of the crankshaft module at a predetermined distance.

The central axis of the crankshaft module may be spaced apart from the cylinder central axis of the engine at a predetermined distance, the central axis of the first balance shaft module and the central axis of the second balance shaft module may be disposed to be symmetrical to each other on the basis of the cylinder central axis of the engine, the central axis of the first balance shaft module and the central axis of the second balance shaft module may be disposed at the same height on the basis of the cylinder, and the central axis of the first balance shaft module may be spaced apart from the central axis of the second balance shaft module at a predetermined distance.

The first balance shaft module and the second balance shaft module may pump oil.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, unless explicitly described to the contrary throughout the specification, the word "comprise" and variations such as "comprises" or "comprising", will be understood to imply the inclusion of stated elements but not the exclusion of any other elements.

Figure 1:
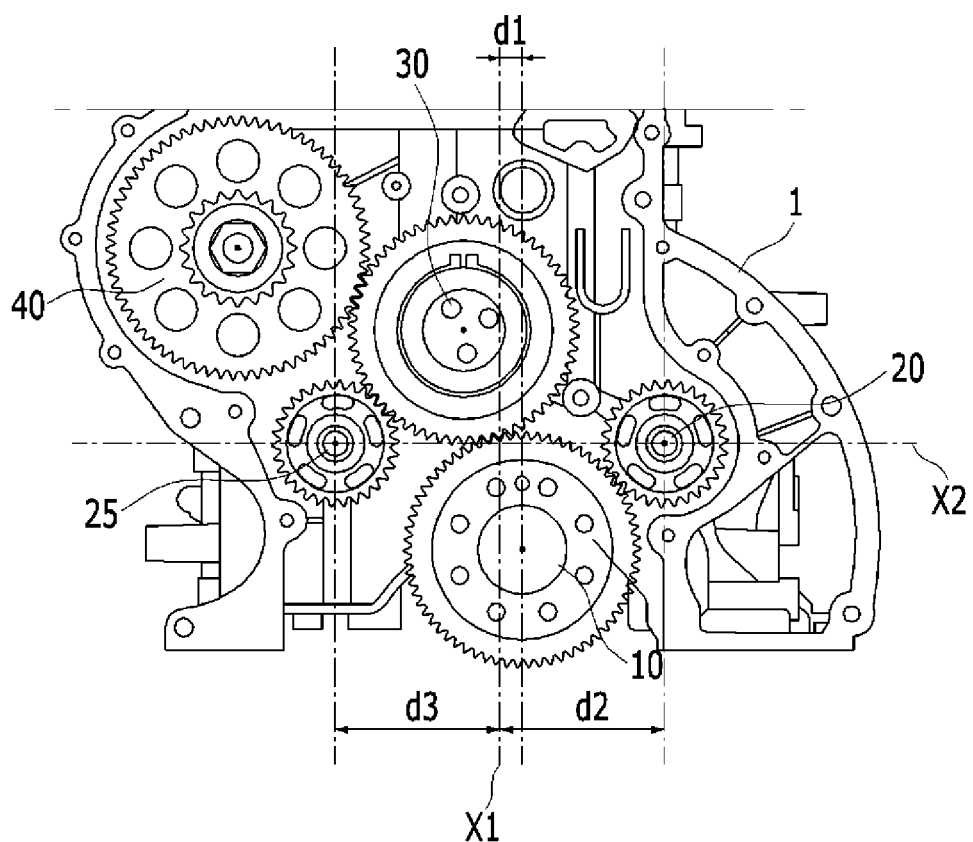
FIG. 1 is a view illustrating an exemplary structure of an engine according to the present invention.

FIG. 1 is a view illustrating a structure of an engine according to various embodiments of the present invention.

Figure 2:
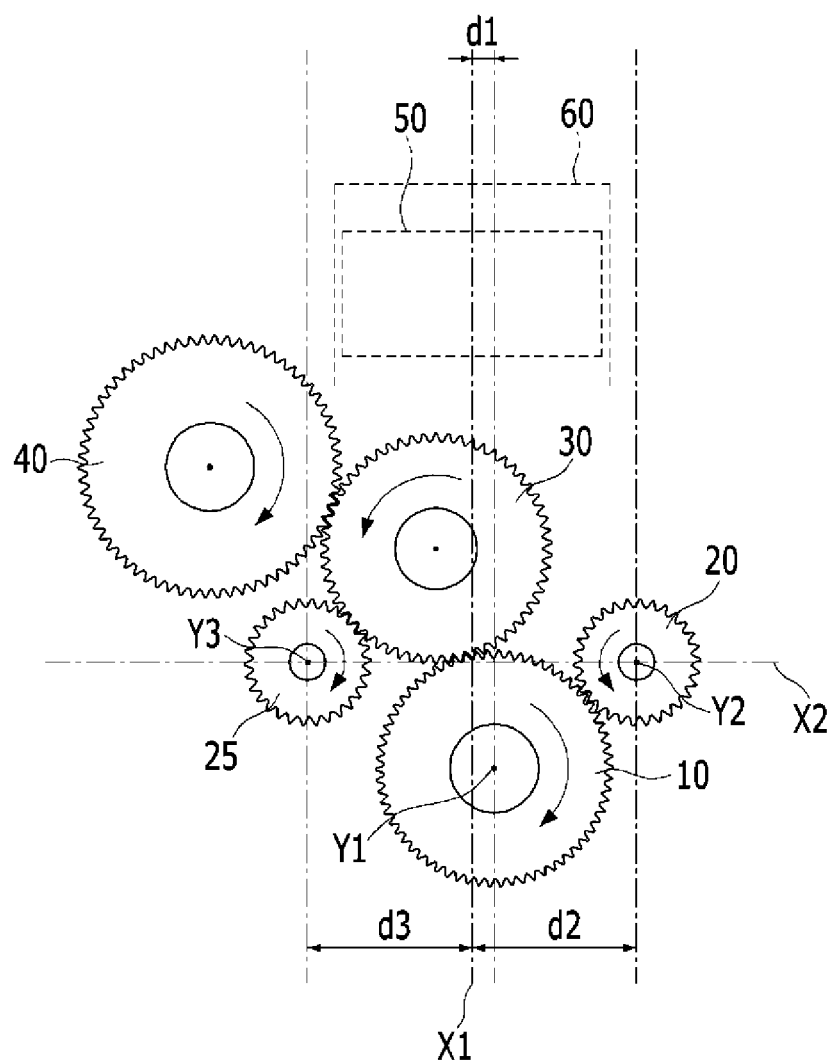
FIG. 2 is a view schematically illustrating an exemplary power transmission structure of a crankshaft module and a balance shaft module according to the present invention.

FIG. 2 is a view schematically illustrating a power transmission structure of a crankshaft module and a balance shaft module according to various embodiments of the present invention.

Referring to FIGS. 1 and 2, a structure of an engine according to various embodiments of the present invention includes a crankshaft module 10, a first balance shaft module 20, a second balance shaft module 25, an intermediate gear 30, a fuel injection pump module 40, a piston 50, and a cylinder 60.

The crankshaft module 10, the first balance shaft module 20, the second balance shaft module 25, and the fuel injection pump module 40 have gears. That is, the first balance shaft module 20, the second balance shaft module 25, the intermediate gear 30, and the fuel injection pump module 40 are driven by being operated together by gears in accordance with a rotation of the crankshaft module 10.

The crankshaft module 10 serves to convert reciprocal motion of the piston 50 into rotational motion. In order to offset unbalanced force by reciprocal motion of the piston 50, the first balance shaft module 20 and the second balance shaft module 25 are provided.

In various embodiments of the present invention, the first balance shaft module and the second balance module serve to pump oil. The oil needs to be supplied to partial constituent elements of an engine 1. In various embodiments of the present invention, the first balance shaft module and the second balance shaft module serve as oil pumps without using an additional oil pump.

In order to produce resultant force of the first balance shaft module 20 and the second balance shaft module 25 in a direction opposite to a direction of the unbalanced force, the first balance shaft module 20 and the second balance shaft module 25 need to have the same shape and be disposed at positions on the same plane at both sides of the crankshaft module 10.

In a case in which the crankshaft module 10 is directly gear-meshed with the first balance shaft module 20, when the crankshaft module 10 rotates clockwise, the first balance shaft module 20 rotates counterclockwise.

In order to produce resultant force with the first balance shaft module 20, the second balance shaft module 25 needs to rotate clockwise that is an opposite direction. Therefore, the second balance shaft module 25 may not be directly gear-meshed with the crankshaft module 10, and the intermediate gear 30 needs to be installed.

In a case in which a rotation center of the crankshaft module 10 is positioned on a cylinder central axis X1, the first balance shaft module 20 and the second balance shaft module 25 are not disposed from the cylinder central axis X1 at the same distance, thereby adversely affecting engine vibration.

Therefore, a central axis Y1 of the crankshaft module 10 is spaced apart from the cylinder central axis X1 at a predetermined distance d1.

In the present specification, 'a central axis Y1 of the crankshaft module' means an axis which passes through the rotation center of the crankshaft module and becomes a reference of a rotation. In addition, in the present specification, 'a central axis Y2 of the first balance shaft module' means an axis which passes through a rotation center of the first balance shaft module and becomes a reference of a rotation, and 'a central axis Y3 of the second balance shaft module' means an axis which passes through a rotation center of the second balance shaft module and a reference of a rotation.

That is, the central axis Y1 of the crankshaft module is spaced apart from the cylinder central axis X1 of the engine at the predetermined distance d1. The central axis Y1 of the crankshaft module is spaced apart from the cylinder central axis X1 of the engine at the predetermined distance d1 in a central axis direction of the first balance shaft module.

The state in which the rotation center of the crankshaft module 10 does not coincide with the cylinder central axis X1 is referred to as a crank offset. By the crank offset, thrust force is reduced at the expansion stroke, and thereby friction and vibration may be reduced.

In a case in which the central axis Y1 of the crankshaft module 10 is spaced apart from the cylinder central axis X1 at the predetermined distance d1, a distance d2 between the central axis Y2 of the first balance shaft module 20 and the cylinder central axis X1 may coincide with a distance d3 between the central axis Y3 of the second balance shaft module 25 and the cylinder central axis X1.

Here, the predetermined distance d1 may be 6 to 10 mm. If the predetermined distance d1 is too small, there is no effect of the crank offset, and if the predetermined distance d1 is too large, it is disadvantageous in terms of engine layout.

The central axis Y2 of the first balance shaft module 20 and the central axis Y3 of the second balance shaft module 25 are disposed to be symmetrical to each other on the basis of the cylinder central axis X1 of the engine, and the central axis Y2 of the first balance shaft module 20 and the central axis Y3 of the second balance shaft module 25 are disposed at the same height on the basis of the cylinder 60.

An axis X2, which passes through the central axis Y2 of the first balance shaft module and the central axis Y3 of the second balance shaft module, is disposed above the central axis Y1 of the crankshaft module to be spaced apart from the central axis Y1 of the crankshaft module at a predetermined distance. Here, the predetermined distance may be determined in consideration of reducing the size of the engine. The predetermined distance may be 70 to 100 mm.

The central axis Y2 of the first balance shaft module 20 is spaced apart from the central axis Y3 of the second balance shaft module 25 at a predetermined distance. Here, the predetermined distance may be determined in consideration of reducing the size of the engine. Reducing the size of the engine is possible whenever the distance d2 between the central axis Y2 of the first balance shaft module 20 and the cylinder central axis X1, and the distance d3 between the central axis Y3 of the second balance shaft module 25 and the cylinder central axis X1 are decreased.

The fuel injection pump module 40 serves to compress fuel so as to supply fuel to an injector at high pressure. The fuel injection pump module 40 is gear-meshed with the crankshaft module 10 through the intermediate gear 30.

Therefore, according to various embodiments of the present invention, a position of the crankshaft module 10 is specified, and positions of the first balance shaft module 20 and the second balance shaft module 25 are adjusted, thereby improving an NVH of the engine and reducing the size of the engine.

In addition, since it is not necessary to provide separate devices to improve the NVH of the engine, cost may be reduced, a weight of the engine may be reduced, and reducing the size of the engine is possible.

In addition, fuel efficiency may be improved by reducing a loss of energy that may occur when a separate device is provided.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A structure of an engine, comprising:
   a crankshaft module to convert reciprocal motion of a piston into rotational motion; and
   a first balance shaft module and a second balance shaft module to reduce vibration of the engine;
   wherein the first balance shaft module is directly gear-meshed with the crankshaft module; and
   wherein the second balance shaft module is gear-meshed with the crankshaft module through an intermediate gear, which is gear-meshed with crankshaft module,
   wherein a central axis of the crankshaft module is spaced from a cylinder central axis of the engine at a predetermined distance in a central axis direction of the first balance shaft module,
   wherein a central axis of the first balance shaft module and a central axis of the second balance shaft module are symmetrically disposed to each other with respect to a cylinder central axis of the engine, and
   wherein a central axis of the first balance shaft module and a central axis of the second balance shaft module are disposed at a same height with respect to the cylinder.

2. The structure of claim 1, wherein:
   an axis, which passes through a central axis of the first balance shaft module and a central axis of the second balance shaft module, is disposed above a central axis of the crankshaft module and apart from the central axis of the crankshaft module at a predetermined distance.

3. The structure of claim 1, wherein:
   a central axis of the crankshaft module is spaced from a cylinder central axis of the engine at a predetermined distance;
   a central axis of the first balance shaft module and a central axis of the second balance shaft module are symmetrically disposed to each other with respect to the cylinder central axis of the engine;
   the central axis of the first balance shaft module and the central axis of the second balance shaft module are disposed at the same height with respect to the cylinder; and
   the central axis of the first balance shaft module is spaced from the central axis of the second balance shaft module at a predetermined distance.

4. The structure of claim 3, wherein:
   the first balance shaft module and the second balance shaft module pump oil.

5. A structure of an engine, comprising:
   a crankshaft module to convert reciprocal motion of a piston into rotational motion;
   a first balance shaft module and a second balance shaft module to reduce vibration of the engine; and
   a fuel injection pump module to supply fuel at high pressure;
   wherein the first balance shaft module is directly gear-meshed with the crankshaft module;
   wherein the second balance shaft module is gear-meshed with the crankshaft module through an intermediate gear, which is gear-meshed with crankshaft module; and
   wherein the fuel injection pump module is gear-meshed with the crankshaft module through the intermediate gear,
   wherein a central axis of the crankshaft module is spaced from a cylinder central axis of the engine at a predetermined distance in a central axis direction of the first balance shaft module,
   wherein a central axis of the first balance shaft module and a central axis of the second balance shaft module are symmetrically disposed to each other with respect to a cylinder central axis of the engine, and
   wherein a central axis of the first balance shaft module and a central axis of the second balance shaft module are disposed at the same height with respect to the cylinder.

6. The structure of claim 5, wherein:
   an axis, which passes through a central axis of the first balance shaft module and a central axis of the second balance shaft module, is disposed above a central axis of the crankshaft module spaced from the central axis of the crankshaft module at a predetermined distance.

7. The structure of claim 5, wherein:
   a central axis of the crankshaft module is spaced from a cylinder central axis of the engine at a predetermined distance;
   a central axis of the first balance shaft module and a central axis of the second balance shaft module are symmetrically disposed to each other with respect to the cylinder central axis of the engine;
   the central axis of the first balance shaft module and the central axis of the second balance shaft module are disposed at the same height with respect to the cylinder; and
   the central axis of the first balance shaft module is spaced from the central axis of the second balance shaft module at a predetermined distance.

* * * * *